B. G. BRAINE.
MEANS FOR INSULATING RAIL JOINTS.
APPLICATION FILED AUG. 8, 1914.
Reissued Oct. 19, 1915.
13,994.
3 SHEETS—SHEET 1.
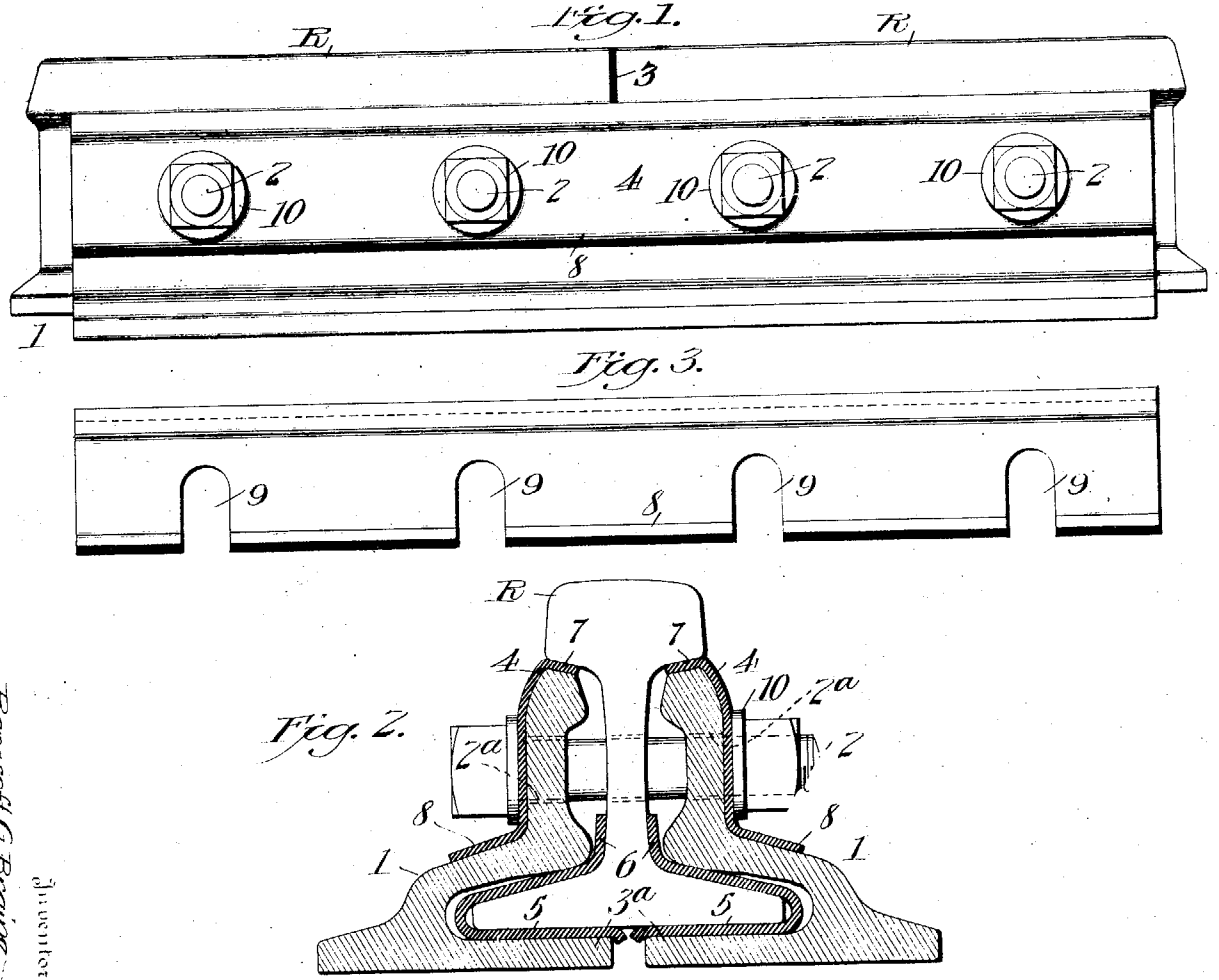
Witnesses
T. L. Mockabee
Emory L. Groff
Inventor
Bancroft G. Braine
By S. P. Wolhaupter
his Attorney B. G. BRAINE.
MEANS FOR INSULATING RAIL JOINTS.
APPLICATION FILED AUG. 8, 1914.
Reissued Oct. 19, 1915.
13,994
3 SHEETS—SHEET 2.
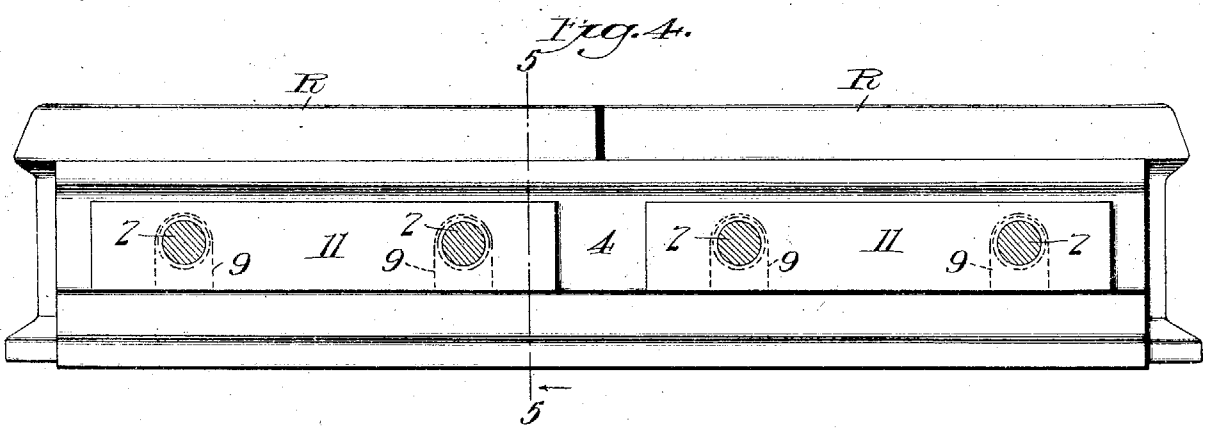
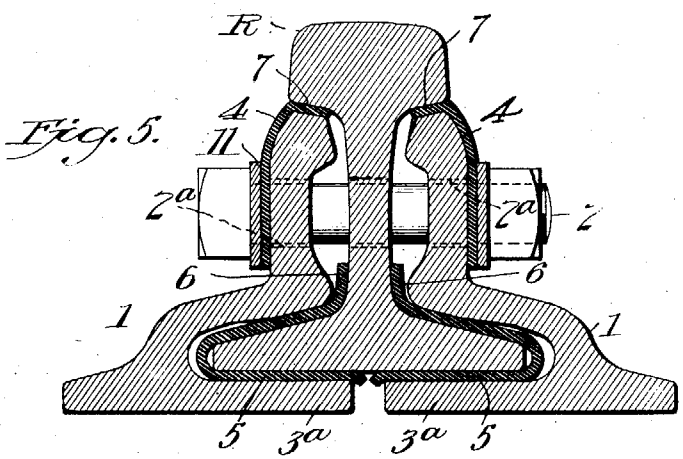
Witnesses
T. L. Morsbach
Tomony L. Groff
Inventor
Bancroft G. Braine
By D. D. Wilhauk
His Attorney B. G. BRAINE.
MEANS FOR INSULATING RAIL JOINTS.
APPLICATION FILED AUG. 8, 1914.
Reissued Oct. 19, 1915.
13,994.
3 SHEETS—SHEET 3.
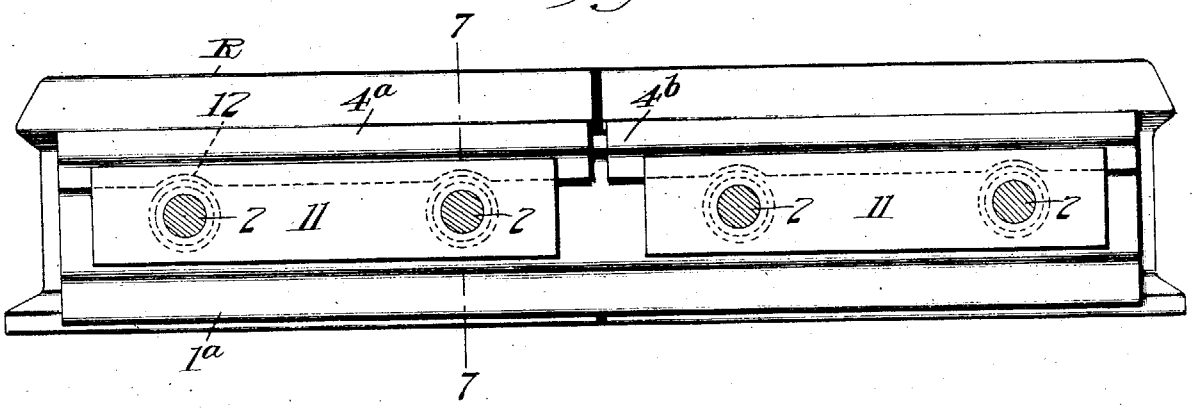
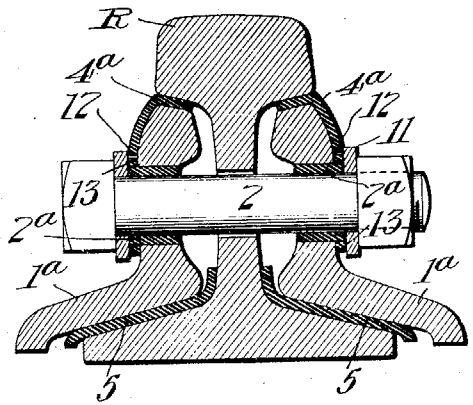
Witnesses
T. L. Mockler
Emory L. Groff
Inventor
Bancroft G. Braine
By D. N. Wolhaupter
his Attorney

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

MEANS FOR INSULATING RAIL-JOINTS.

13,994. Specification of Reissued Letters Patent. Reissued Oct. 19, 1915.

Original No. 1,048,284, dated December 24, 1912, Serial No. 710,716. Application for reissue filed August 8, 1914. Serial No. 855,927.

*To all whom it may concern:*

Be it known that I, BANCROFT G. BRAINE, a citizen of the United States, residing at New York city, in the county of New York and State of New York, have invented certain new and useful Improvements in Means for Insulating Rail-Joints, of which the following is a specification.

This invention relates to insulation for rail joints of the insulated type, and more particularly to that character of rail joint insulation known as "divided-fiber," wherein the insulation is in two parts, respectively for the head and base flange portions of the rails, whereby a minimum amount of insulating material may be used to the best advantage both electrically and mechanically, and admitting of the ready removal of worn-out pieces of insulation, without disturbing or affecting the remaining good or unworn insulation.

It is well known that the insulating material of an insulated rail joint usually wears out much more rapidly under the head of the rail than at the base thereof, and such insulation, therefore, usually requires frequent renewal.

Accordingly, one of the principal objects of the invention is to provide a novel arrangement of the insulating material in a "divided-fiber" rail joint, wherein that part of the insulation which is subject to the most rapid wear is readily removable and replaceable without disturbing or affecting the remaining portions of good, or unworn insulation, thus involving the most economical conditions for maintenance and repair.

A further and distinctive object of the invention is to provide a novel disposition of the head sections of insulation, outside of the joint bars, whereby the same are rendered most readily accessible for purposes of removal and replacement with the least possible disturbance of the joint parts, while at the same time providing effectual means for thoroughly insulating the joint at the under sides of the rail heads, as well as between the outer faces of the joint bars and the bolt heads. In this connection, it is well understood by those familiar with the art that, in insulated rail joints a more or less frequent source of trouble arises from the metal washers or the heads and nuts of the bolts coming in contact with the lower flange part of the angle bar, and at times causing current leakage or breakdown to the electric circuits, this trouble being experienced paricularly in connection with small rails having short fishing spaces. But, by reason of the novel outside arrangement of insulating material, as contemplated by the present invention, this difficulty is not only corrected but effectually prevented.

With these and many other objects in view which will more readily appear as the details of the invention are fully understood, the same consists in the novel construction, combination, and arrangement of parts hereinafter more fully described, illustrated, and claimed.

Though susceptible of embodiment in various types of rail joints, and adaptable for use with any form of joint bar or splice that may be employed in an insulated rail joint, three practical embodiments of the invention are shown for illustrative purposes in the accompanying drawings, in which—

Figure 1 is a side elevation of an insulated rail joint embodying the improved insulation, in accordance with the present invention. Fig. 2 is a central, vertical cross sectional view of the joint illustrated in Fig. 1. Fig. 3 is an elevation of the improved fiber head piece herein termed the head section of insulation for the joint. Fig. 4 is a side elevation of a modification of the joint, illustrating the invention embodied in a construction wherein bolt straps or plates are employed instead of the metal washers shown in Figs. 1 and 2 of the drawings, the view illustrating the bolts in section and the nuts removed. Fig. 5 is a cross sectional view of the modified joint illustrated in Fig. 4, the section being taken on the line 5—5 of Fig. 4. Fig. 6 is a side elevation of another modification of the invention, wherein the head section of insulation does not extend below the line of joint bolts, and also illustrating the application of the invention to a one end insulated joint wherein the fiber head piece only extends one half the length of the joint and is associated with a corresponding metal filler. Fig. 7 is a cross sectional view of the modification on the line 7—7 of Fig. 6.

Like references designate corresponding parts in the several figures of the drawings.

The improved insulating means, forming the subject matter of this application, are intended to be applicable to various kinds of rail joints, and hence available for use with fish plates, plain angle bars, joint bars of the continuous type, channel bars, or any of the divers forms of splices which connect the rails and extend across the joint between them. In all of its applications, the invention possesses the same utility and subserves the same functions.

As above indicated, the present invention relates to novel means for arranging divided insulation for rail joints. This divided insulation is usually in two parts, respectively for the head and base flange portions of the rails. These separate sections of insulation are separately renewable and replaceable, and by way of illustrating the application of my invention in connection with insulation of this character, reference is made to the drawings, wherein is shown and illustrated a rail joint including the rails R, R, side joint bars 1, the usual joint bolts 2, which are insulated from the joint bars by any of the approved bolt insulating expedients, such as the bolt insulation 2[a] shown in the drawings, an insulating end post 3 between the rail ends, and divided or two part insulation between the rails and the joint bars. This divided or two part insulation comprises an upper head section of insulation 4, and a lower base section of insulation 5.

The sections of insulation 4 and 5 are made of the usual fiber sheets, or other insulating material, and each of the same may extend the entire length of the joint or be of less extent, without affecting the improvements claimed herein.

Though applicable to various kinds of rail joint bars, the improvements in Figs. 1 and 2 are illustrated as preferably associated with joint bars of the well known continuous type which include splice members fitting the fishing spaces of the rails and the integral rail supporting base sections 3[a] underlying the bases of the rails. Accordingly, in the illustrated embodiment of the invention, the lower or base section of insulation 5 is shown as being in the form of an insulating cuff fitted over the base flange of the rails, and having portions interposed between the splice member of the joint bar and the upper side of the rail flanges, and beneath the undersides of the latter and the upper side of the base section or base plate. As shown, the base section of insulation 5 also usually includes at its inner edge an upstanding flange portion 6 arranged next to the webs of the rails to effectually insulate the bottom inside corners of the joint bars from the rails.

According to the present invention, the upper or head section of insulation 4 occupies a position on the outside of the joint bars. That is to say, in a joint of the type illustrated, each of the joint bars has arranged upon the outer side thereof a separate renewable head section of insulation 4. This section of insulation extends over the outer face of the bar and is provided at its upper edge with an inwardly extending head flange 7 adapted to constitute the insulating separator between the under sides of the rail heads and the upper edge of the joint bar. Also, in addition to the head flange 7 at the top thereof, the sheet of insulation 4, in the embodiment shown in Figs. 1, 2 and 3, is provided at its lower edge with an outturned apron extension 8 which fits into the outside lower corner of the joint bar and projects a sufficient distance below the line of the bolts to prevent the heads and nuts thereof or the metal washers from coming into an electrical contact with the lower part of the joint bar.

In its preferred application, the head section of insulation 4 is provided in its web with a plurality of keeper notches 9 that engage over the bolts 2, thus providing a direct interlock between the insulation and the bolts which prevents longitudinal creeping or displacement of the insulation. Also, by reason of the arrangement of the head sections of insulation upon the outer sides of the joint bars, such insulation is clamped and retained in place by the heads and nuts of the bolts, or by interposed washers, binding against the same. In this connection, it will be observed that the mere loosening of the bolts, and the removal thereof, permits of the renewal of the head sections of insulation at either or both sides of the joint with the greatest facility, and without removing either the base insulation or any of the other joint elements.

In the form of the invention shown in Figs. 1 and 2 of the drawings, metal backing washers 10 are illustrated as being interposed between the insulation sheets 4 and the heads and nuts of the bolts, but a modification that may be resorted to in this particular is shown in Figs. 4 and 5 of the drawings, wherein bolt straps 11 are substituted for the individual washers 10. Also Figs. 4 and 5 of the drawings suggest a further modification of the invention in the particular of omitting the bottom apron extensions 8 of the insulation sheets.

Further modifications that may be resorted to in carrying out the invention are suggested in Figs. 6 and 7 of the drawings. As illustrated in these figures of the drawings, the outside head section of insulation 4[a] may be in the form of a strip of insulating material, of relatively narrow width, so that the same does not extend below the line of the joint bolts. This strip of insulating material is disposed above the line of the joint bolts and may be provided in its lower edge with keeper notches 12 which have an interlocking engagement with washers 13, either metal or fiber, which are arranged between the outer face of the joint bars and the inner side of the metal clamping members which lie behind the heads and nuts of the bolts. These metal clamping members may be either the metal washers 10, such as shown in Figs. 1 and 2, or may be the metal bolt straps 11 which are shown in said Figs. 6 and 7. Also, it will be observed that the washers or equivalent elements 13 arranged about the bolts and interlocked with the fiber strip 4ª may conveniently be the fiber washer of the bolt insulation shown, and which consists of said washer and a bolt ferrule or sleeve.

The modified structure shown in Figs. 6 and 7 of the drawings, the interlocking of the fiber head piece or section 4ª with the joint bolts, through the indirect connection described, prevents longitudinal displacement of said head piece or section, at the same time not interfering with the clamping or binding engagement thereof by the clamping element of plate 11. Furthermore, Figs. 6 and 7 of the drawings illustrate the application of the invention to joint bars 1ª of the common angle bar type and also show the adaptation of the invention to a one end insulation of the joint, wherein the fiber section or head piece 4ª extends only half the length of the joint, and has associated therewith, at the same side of the joint, a corresponding metal filler piece 4ᵇ. This metal filler piece is of the same construction and mounted in the same manner as the corresponding fiber head piece 4ª at the same side of the joint.

I wish it to be understood that I do not confine my invention to the various details of construction described, as other modifications and changes in the form, proportion, and minor details of construction may be resorted to without departing from the spirit or sacrificing any of the advantages of the invention.

What I claim as my invention and desire to secure by Letters Patent is:

1. In an insulated rail joint, the rails, a joint bar, and a head section of insulation removably clamped upon the outer side of the bar and engaging beneath the rail heads.

2. In an insulated rail joint, the rails, a joint bar, and a head section of insulation removably clamped upon the outer side of the joint bar.

3. In an insulated rail joint, the rails, a joint bar, and a head section of insulation removably clamped upon the outside of the joint bar and interlocked with the joint bolts.

4. In an insulated rail joint, the rails, a joint bar, and a head section of insulation removably held by the joint bolts upon the outside of the bar and engaging beneath the rail heads.

5. In an insulated rail joint, the rails, a joint bar, and a head section of insulation removably held by the joint bolts upon the outside of the bar.

6. In an insulated rail joint, the rails, the joint bar, and a section of insulation arranged upon the outside of the bar and detachably interlocked with the joint bolts and adapted to be clamped by the heads or ends of the bolts.

7. In an insulated rail joint, the rails, the joint bar, and a section of insulation arranged upon the outside of the bar and detachably interlocked with the joint bolts and adapted to be clamped by the heads or ends of the bolts.

8. In an insulated rail joint, the rails, a joint bar, and a head section of insulation arranged upon the outside of the joint bar and loosely interlocked with the joint bolts, said insulation engaging beneath the rail heads and adapted to be clamped by the heads or nuts of the bolts.

9. In an insulated rail joint, the rails, a joint bar, a head section of insulation arranged upon the outside of the joint bar and having an upper head flange adapted to engage beneath the rail heads, and a lower apron extension arranged as an insulating separator between the lower part of the bar and the heads or nuts of the bolts.

10. In a divided-fiber insulated rail joint, the rails, a joint bar, and separate head and base sections of insulation respectively arranged upon the outer and inner sides of the bar, the head section of insulation being retained in place by the bolts and provided with a head flange engaging beneath the rail heads.

11. In an insulated rail joint, the rails, a joint bar, and an outside section of insulation arranged upon the outer side of the bar and having an apron extension at its lower edge.

12. In an insulated rail joint, the rails, a joint bar, and an outside section of insulation arranged upon the outer side of the bar and having an apron extension at its lower edge overlying the flange of the joint bar.

13. In an insulated rail joint, the rails, a joint bar, and insulation upon the external face of the bar arranged as an apron overlying the flange of the joint bar.

14. In an insulated rail joint, the rails, a joint bar, and insulation upon the external face of the bar arranged as a separator covering the outward extension of the joint bar.

15. In an insulated rail joint, the rails, a joint bar, and insulation covering the extension of the joint bar to form an insulating separator between the outward extension of the bar and the heads or nuts of the bolts.

16. In an insulated rail joint, the rails, a joint bar, the joint bolts, and an outside section of insulation arranged as an insulating separator between the lower part of the bar and the heads or nuts of the bolts.

17. In an insulated rail joint, the rails, a joint bar, and an outside section of insulation removably held by the joint bolts upon the outer side of the bar, and having a lower apron extension.

18. In an insulated rail joint, the rails, a joint bar, and an outside section of insulation removably held by the joint bolts on the outer side of the bar and having an apron extension.

19. In an insulated rail joint, the rails, a joint bar, and an outside section of insulation removably held by the joint bolts upon the outer side of the bar, and having an apron extension at its lower edge overlying the flange of the joint bar.

In testimony whereof, I hereunto affix my signature in the presence of two witnesses.

BANCROFT G. BRAINE.

Witnesses:

BENJ. WOLHAUPTER,

KATHERINE MCNALLY.